UNITED STATES PATENT OFFICE.

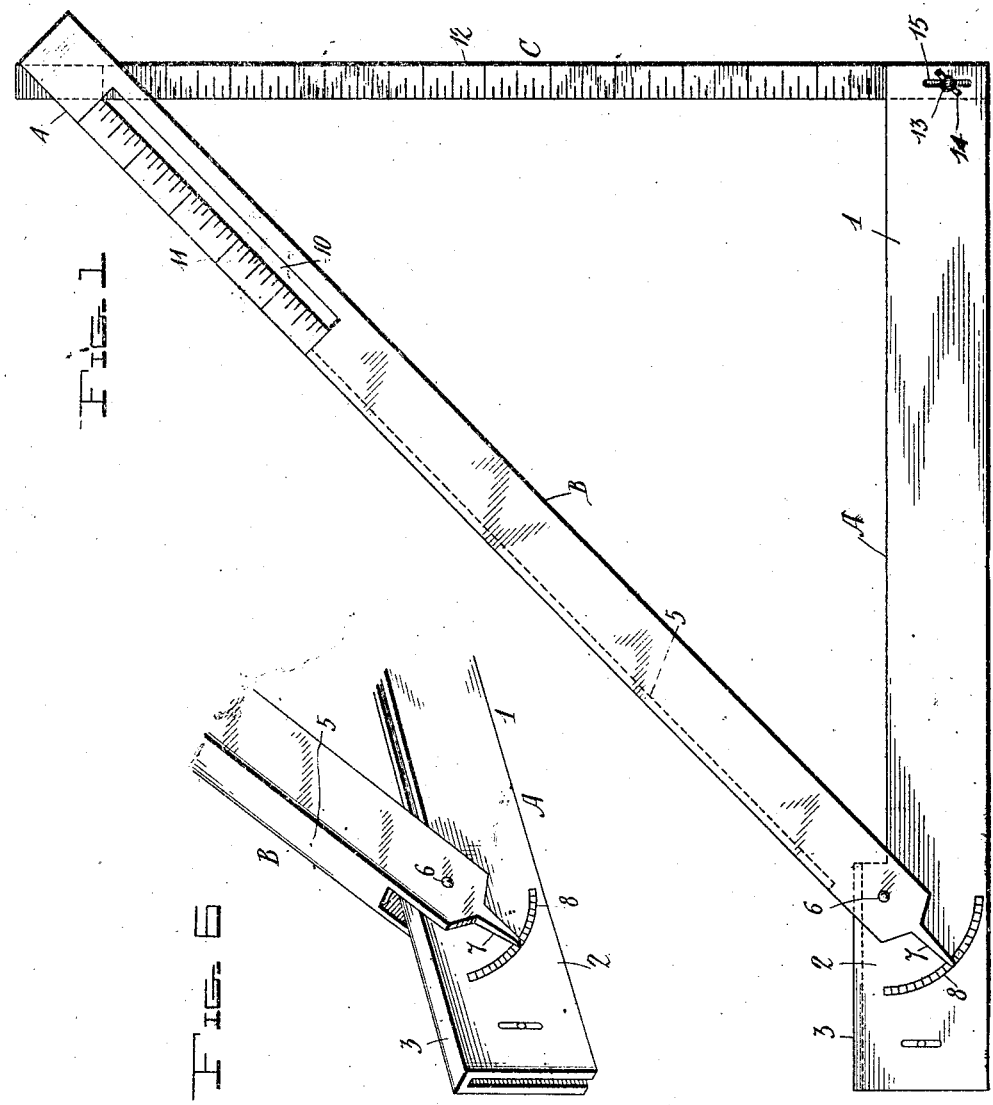

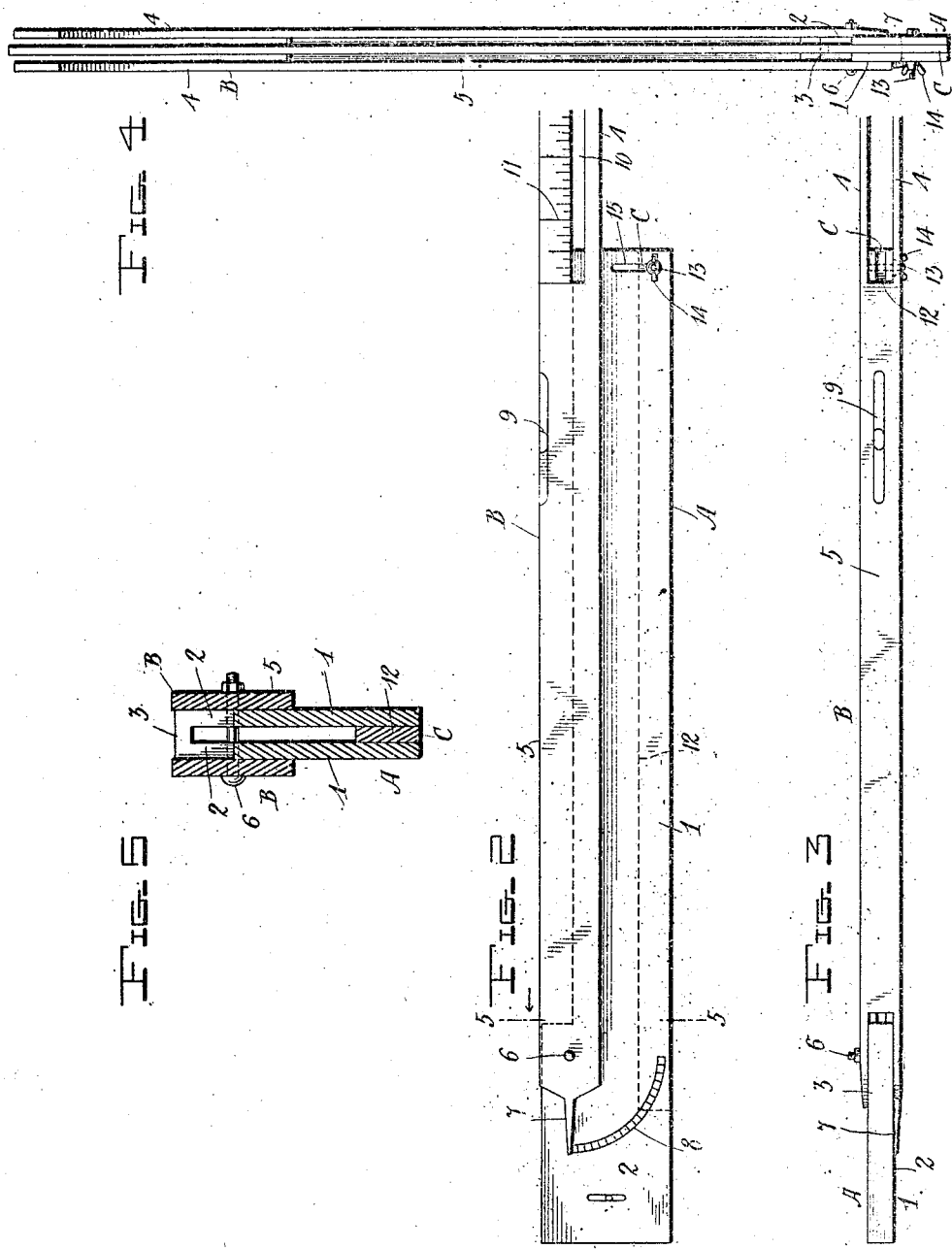

EDMUND W. ELLINGTON, OF OWENSBORO, KENTUCKY.

MEASURING IMPLEMENT.

No. 874,751.        Specification of Letters Patent.        Patented Dec. 24, 1907.

Application filed August 30, 1907. Serial No. 390,778.

*To all whom it may concern:*

Be it known that I, EDMUND W. ELLINGTON, a citizen of the United States, residing at Owensboro, in the county of Daviess and State of Kentucky, have invented new and useful Improvements in Measuring Implements, of which the following is a specification.

This invention relates to that class of measuring instruments in which are embodied a plurality of arms or members, pivotally connected with each other, and one of said arms or members being equipped with a spirit level; the several parts or members being so constructed, arranged and assembled as to present an organized implement which may be conveniently utilized for a variety of purposes; for instance, for the purpose of determining the relative rise or inclination of a given slope; for framing timbers and for various other purposes which will readily suggest themselves.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings, Figure 1 is a side elevation showing the improved measuring instrument, extended. Fig. 2 is a side elevation showing the implement folded. Fig. 3 is a top plan view showing the implement folded. Fig. 4 is a front end view showing the implement extended, as in Fig. 1. Fig. 5 is a transverse sectional view on a slightly enlarged scale taken on the plane indicated by the line 5—5 in Fig. 2. Fig. 6 is a perspective detail view of the rear portion of the implement.

Corresponding parts in the several figures are denoted by like characters of reference.

The improved implement embodies in its construction a body or base member A, a level arm B and a scale arm C.

The several parts or members are preferably made of sheet metal, such as steel or brass. The body or base member A comprises two parallel side members 1—1 which are provided at what will be designated as their rear ends with upward extending flanges 2—2 connected by a bridge piece 3 which latter is preferably integral with the side members; the base or body being formed from a suitable blank of sheet metal which is afterwards bent or stamped to the proper shape.

The level arm B is composed of parallel side members 4—4 which are connected throughout the greater portions of their lengths by a bridge piece 5 of suitable width to straddle the base member A so that when the parts are assembled, the side members 4—4 of the level arm will lie flat against the outer sides or faces of the side members 1—1 of the base. The level arm B is pivotally connected with the base A, near the rear end of the latter, a pin 6 extending transversely through the flanges 2—2, and one of the side members of the level arm is provided adjacent to the pivot 6 with a pointer or index 7 coöperating with an arcuate scale 8 which is formed upon the base A, concentric with the pivot 6, and which constitutes a protractor. The arm B carries a spirit level 9; and said arm is provided near its free end with a longitudinal slot 10 extending through the side members of said arm; one edge of said slot being radial to the pivot 6 and provided with an indicating scale 11 which is preferably laid out to represent inches and fractions thereof.

The scale arm C, which is likewise laid out with a scale preferably representing inches and fractions thereof is pivotally supported upon a set screw 12 extending through a slot 13 near the front end of the base member A, said slot extending through the side members of the base, and the screw being equipped with a thumb nut 14 which may be conveniently tightened to clamp or connect the parts securely together. When the parts of the implement are extended for use, the free end of the scale arm C will engage between the free ends of the side members of the level arm B; it being observed that the bridge piece 5 connecting the side members 4—4 of the level arm terminates adjacent to that portion of the side members 5 wherein the slot 10 is formed and which is equipped with the scale 11; it follows that in the various adjustments of the implement the scale arm C is visible through the slot 10, and that the measuring scales upon the scale arm and the level arm may be read in conjunction with each other.

The operation and advantages of the improved measuring implement will be readily understood from the foregoing description when taken in connection with the drawings hereto annexed.

The construction is simple and inexpensive, and the implement when not in use may be readily folded in small compass so that it may be conveniently carried in an ordinary tool box where it occupies but little room.

The various uses of the implement will readily suggest themselves; thus, for instance, the degree of a slope may be readily determined by placing the base member A upon the slope and adjusting the level arm until it occupies a horizontal position when the index 7 will indicate the degree of the slope upon the scale or protractor 8. The manner of using the implement for the purpose of laying out and measuring angles, framing timbers and the like will be readily understood, by those skilled in the art to which the invention appertains. It is simple, convenient, and thoroughly efficient for the purposes for which it is provided.

Having thus fully described the invention, what is claimed as new is:

1. In a measuring implement, a base comprising parallel side members having upward extending flanges connected by a bridge piece, a level arm comprising side members connected by a bridge piece and carrying a spirit level, and a pin pivotally connecting the level arm with the base; one side member of the level arm being provided with an index or pointer, and the base being provided with an arcuate scale coöperating therewith.

2. In a measuring implement, a base comprising spaced parallel side members having flanges connected by a bridge piece, a level arm connected pivotally with the base and having side members connected by a bridge piece, said level arm being provided with a slot having one edge radial to the pivot and provided with a scale; and a scale arm supported pivotally between the side members of the base and capable of extending between the slotted free ends of the side members of the level arm.

3. In a measuring implement, a base comprising spaced parallel side members having flanges connected by a bridge piece, a level arm pivotally connected with the base and comprising side members connected by a bridge piece, one of said side members being provided with an index and the base being provided with an arcuate scale coöperating therewith, and said level arm being provided with a spirit level and with a longitudinal slot having one edge radial to the pivot; and a scale arm pivoted between the side members of the base and capable of extending between the slotted free ends of the side members of the level arm.

In testimony whereof I affix my signature in presence of two witnesses.

EDMUND W. ELLINGTON.

Witnesses:
  G. H. GAYNOR,
  J. H. MAZE.